US012705773B2

(12) United States Patent
Fan et al.

(10) Patent No.: US 12,705,773 B2
(45) Date of Patent: Aug. 11, 2026

(54) SYSTEM AND METHOD OF UNSUPERVISED STEREO MATCHING WITH SURFACE NORMAL ASSISTANCE FOR INDOOR APPLICATIONS

(71) Applicant: Avidbots Corp, Kitchener (CA)

(72) Inventors: Xiule Fan, Waterloo (CA); Ali Jahani Amiri, Kitchener (CA); Baris Fidan, Waterloo (CA); Soo Jeon, Waterloo (CA)

(73) Assignee: AVIDBOTS CORP

( * ) Notice: Subject to any disclaimer, the term of this patent is extended or adjusted under 35 U.S.C. 154(b) by 346 days.

(21) Appl. No.: 18/593,932

(22) Filed: Mar. 3, 2024

(65) Prior Publication Data

US 2024/0320845 A1 Sep. 26, 2024

Related U.S. Application Data

(60) Provisional application No. 63/488,188, filed on Mar. 3, 2023.

(51) Int. Cl.
*G06T 7/593* (2017.01)

(52) U.S. Cl.
CPC .... *G06T 7/593* (2017.01); *G06T 2207/10012* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 11,062,471 B1 * 7/2021 Zhong .................... G06T 7/593
2018/0211401 A1 * 7/2018 Lee .................... G06T 7/593
2022/0051372 A1 * 2/2022 Toft .................... G06T 7/74
2024/0221344 A1 * 7/2024 Kadambi .................... G06T 7/50

* cited by examiner

*Primary Examiner* — Leon Flores

(57) ABSTRACT

A system and method for unsupervised stereo matching with surface normal assistance for indoor applications. According to the disclosure, a deep neural network with a feature extraction module, a normal branch, and a disparity branch is disclosed. The extraction module and the normal branch are trained first in a supervised manner for surface normal prediction. The predicted surface normal is then incorporated into the disparity branch, which is trained later in an unsupervised manner for disparity estimation. The latter unsupervised learning approach can reduce our method's dependence on a large amount of ground truth data that is difficult to collect. Experimental results indicate that our proposed method can predict accurate surface normal at textureless regions. With the help of the surface normal, the predicted disparity at these challenging areas is more accurate, which leads to improved quality of stereo matching in indoor scenarios.

6 Claims, 8 Drawing Sheets

SYSTEM AND METHOD OF UNSUPERVISED STEREO MATCHING WITH SURFACE NORMAL ASSISTANCE FOR INDOOR APPLICATIONS

CROSS REFERENCE TO RELATED APPLICATIONS

The application claims priority to and the benefit of U.S. Provisional Patent Application Ser. No. 63/488,188, entitled "SYSTEM AND METHOD OF UNSUPERVISED STEREO MATCHING WITH SURFACE NORMAL ASSISTANCE FOR INDOOR APPLICATIONS" filed on Mar. 3, 2023, the disclosure of which is incorporated herein by reference in its entirety.

BACKGROUND

The embodiments described herein relate to autonomous and semi-autonomous cleaning devices and more particularly, to a system and method for detecting the status of one or more components and/or systems in a semi-autonomous cleaning device for improved cleaning of indoor surfaces.

The use of autonomous and semi-autonomous devices configured to perform a set of tasks is known. For example, semi-autonomous devices or robots can be used to clean a surface, mow a lawn, collect items from a stocked inventory, etc. In some instances, however, some known robots fail to provide a user with an indication of the robot's position, progress, and/or status of one or more components of the system.

A stereo camera has been widely used by robotic and other intelligent systems to obtain depth information. This camera first captures a pair of stereo images of the physical scene. Using the stereo images, a stereo matching algorithm can compute the corresponding disparity, which is directly related to depth. The accuracy of the stereo matching algorithm affects the quality of the predicted depth.

Stereo cameras that imitate humans' binocular vision utilize stereo matching algorithms to obtain a disparity map, which is a description of the depth information of an environment. Therefore, stereo matching is a popular approach for a robot to achieve depth perception. This work focuses on stereo matching for indoor robots.

In the past decades, various learning and non-learning-based approaches have been proposed to realize stereo matching. The more traditional non-learning-based approaches predict disparity maps that often contain inaccurate or missing estimates. The recent development in learning-based approaches can compute disparity with higher accuracy. However, there are two major disadvantages with these methods. First, learning-based methods that achieve the best accuracy are often trained in a supervised manner. Supervised training requires a large amount of data with ground truth disparity. Second, most of them are evaluated on either synthetic datasets or outdoor datasets for driving scenarios.

Collecting a dataset with ground truth disparity data is a time-consuming and difficult process. This shortcoming increases the difficulty to fine tune a learning-based method for different indoor scenes. Hence, an unsupervised solution that does not require ground truth disparity may be preferred. Additionally, outdoor environments and indoor environments contain very different features. More specifically, indoor environments typically consist of more textureless regions as a result of the overwhelming distribution of floors, walls, and ceilings in indoor scenes. Stereo matching at these textureless regions is a challenging task. Therefore, applying methods designed and trained for outdoor applications to indoor use may not yield the best results.

In summary, the proposed design attempts to solve the above limitations so that it can predict accurate disparity in indoor scenes without the need of learning from a large dataset with ground truth disparity.

SUMMARY

A system and method for unsupervised stereo matching with surface normal assistance for indoor applications is disclosed. Obtaining depth information with a stereo camera is a popular approach adopted by many robotic and intelligent systems. Recently, many learning-based stereo matching algorithms have achieved high accuracy with supervised learning. However, these methods do not consider indoor scenarios with many textureless regions which introduce challenges in stereo matching.

To address this problem, a deep neural network with a feature extraction module, a normal branch, and a disparity branch is proposed. The extraction module and the normal branch are trained first in a supervised manner for surface normal prediction. The predicted surface normal is then incorporated into the disparity branch, which is trained later in an unsupervised manner for disparity estimation. The latter unsupervised learning approach can reduce our method's dependence on a large amount of ground truth data that is difficult to collect. Experimental results indicate that our proposed method can predict accurate surface normal at textureless regions. With the help of the surface normal, the predicted disparity at these challenging areas is more accurate, which leads to improved quality of stereo matching in indoor scenarios.

To obtain a more accurate depth information with stereo cameras, various learning-based stereo-matching algorithms have been developed recently. These algorithms, however, are significantly affected by textureless regions in indoor applications. To address this problem, a new deep-neural-network-based data-driven stereo-matching scheme that utilizes the surface normal is disclosed. The proposed scheme includes a neural network and a two-stage training strategy. The neural network involves a feature-extraction module, a normal-estimation branch, and a disparity-estimation branch. The training processes of the feature-extraction module and the normal-estimation branch are supervised while the training of the disparity-estimation branch is performed unsupervised. Experimental results indicate that the proposed scheme is capable of estimating the surface normal accurately in textureless regions, leading to improvement in the disparity-estimation accuracy and stereo-matching quality in indoor applications involving such textureless regions.

DETAILED DESCRIPTION

Figure 1:
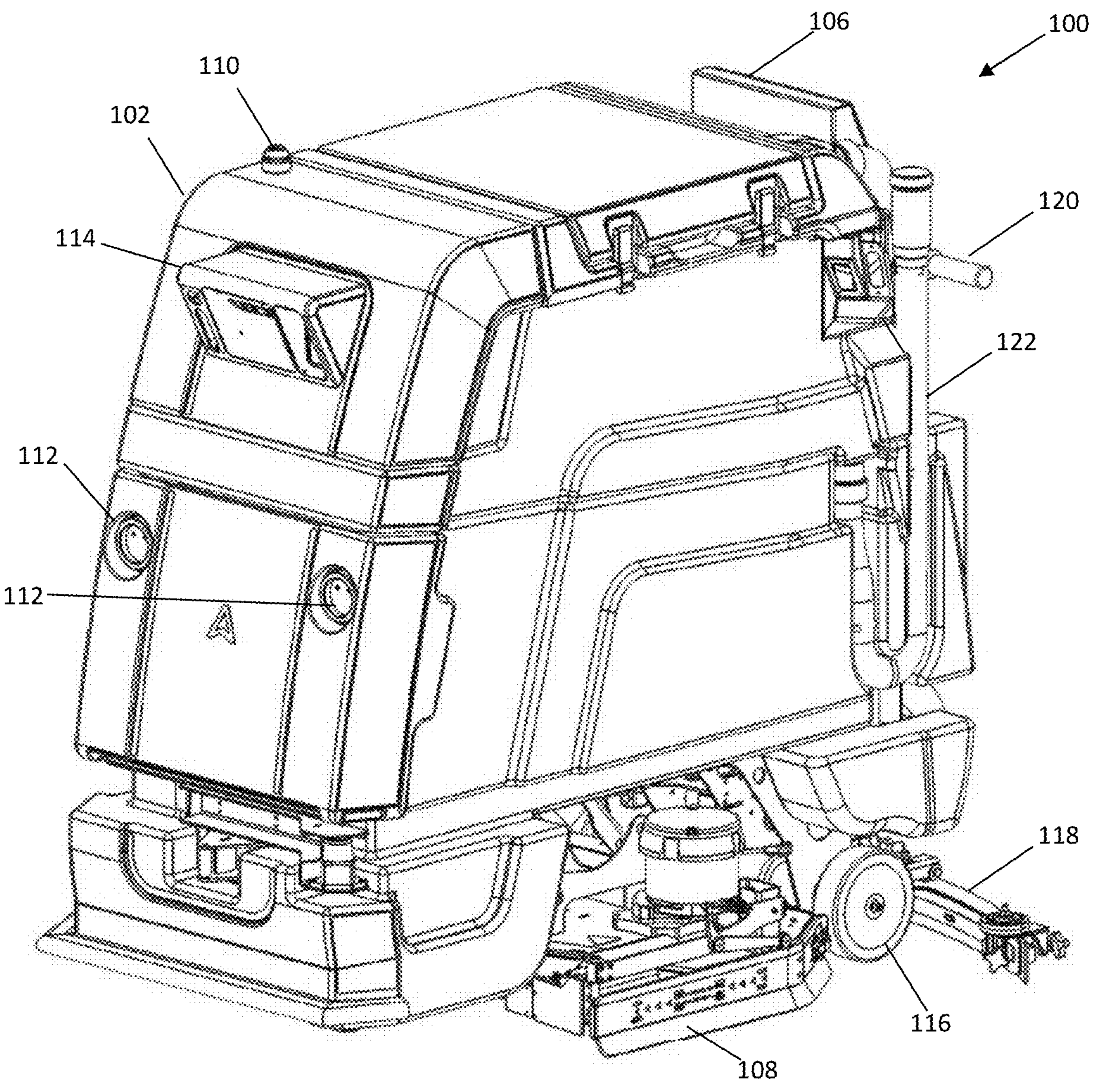
FIG. 1 is a perspective view of a semi-autonomous cleaning device.
Figure 2:
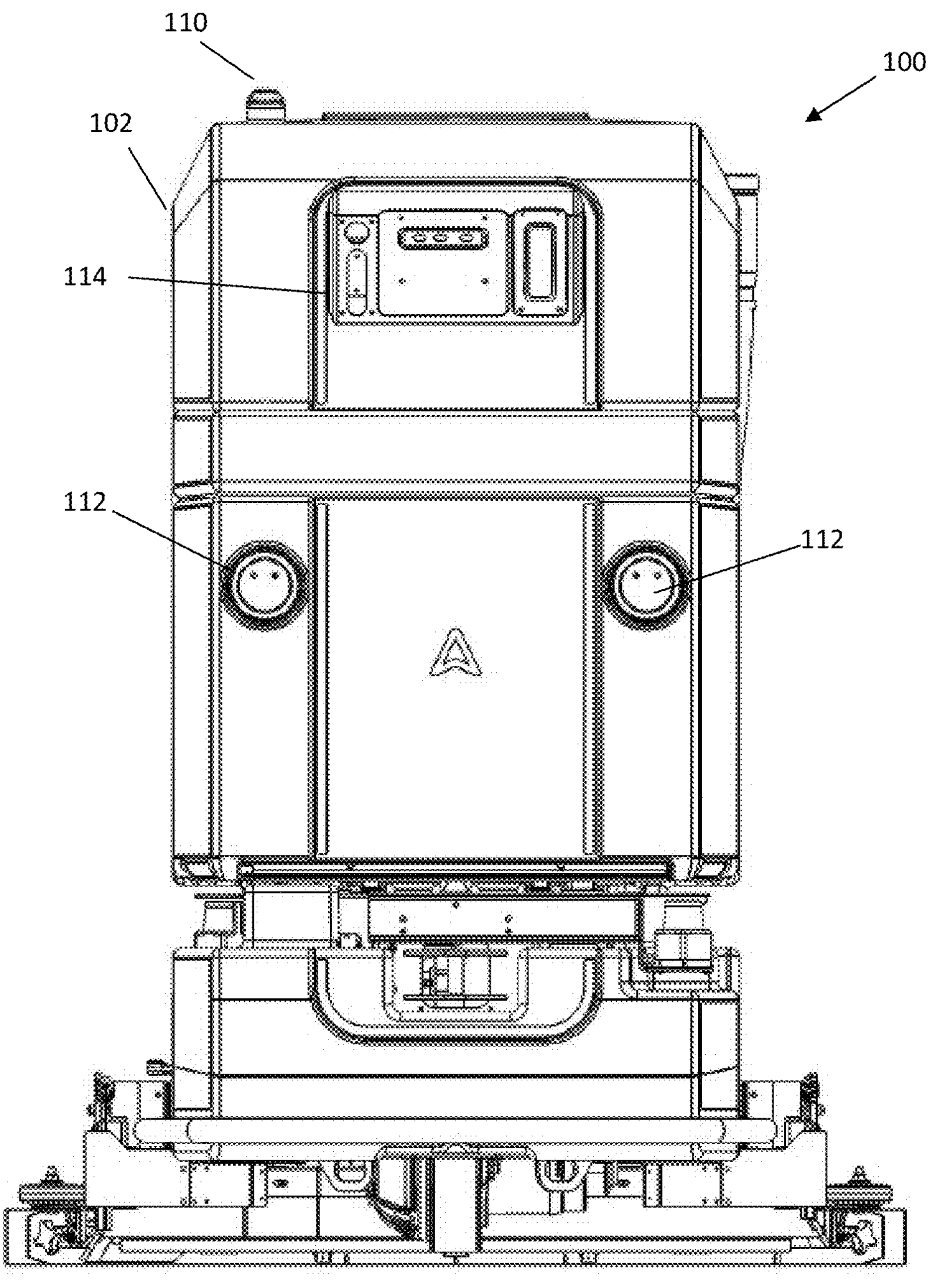
FIG. 2 is a front view of a semi-autonomous cleaning device.
Figure 3:
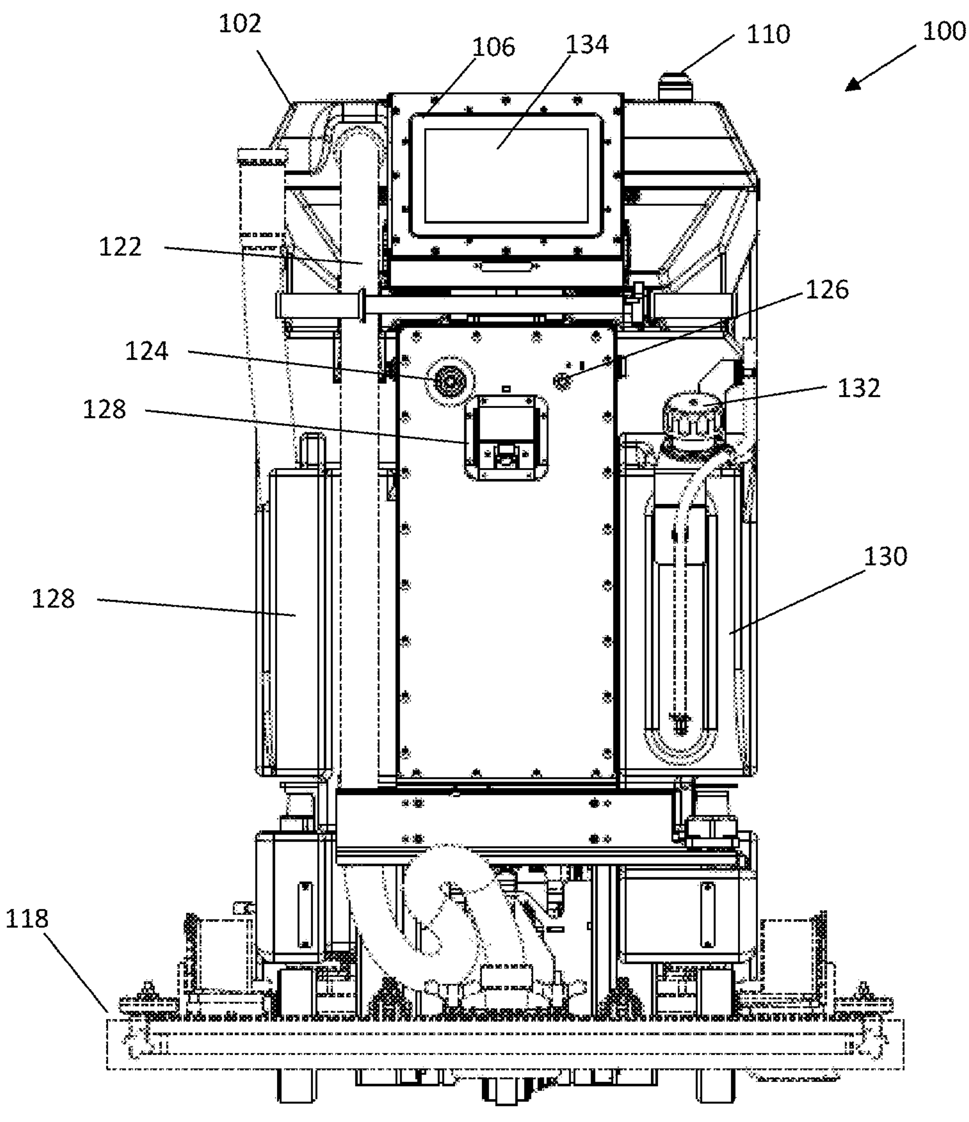
FIG. 3 is a back view of a semi-autonomous cleaning device.
Figure 4:
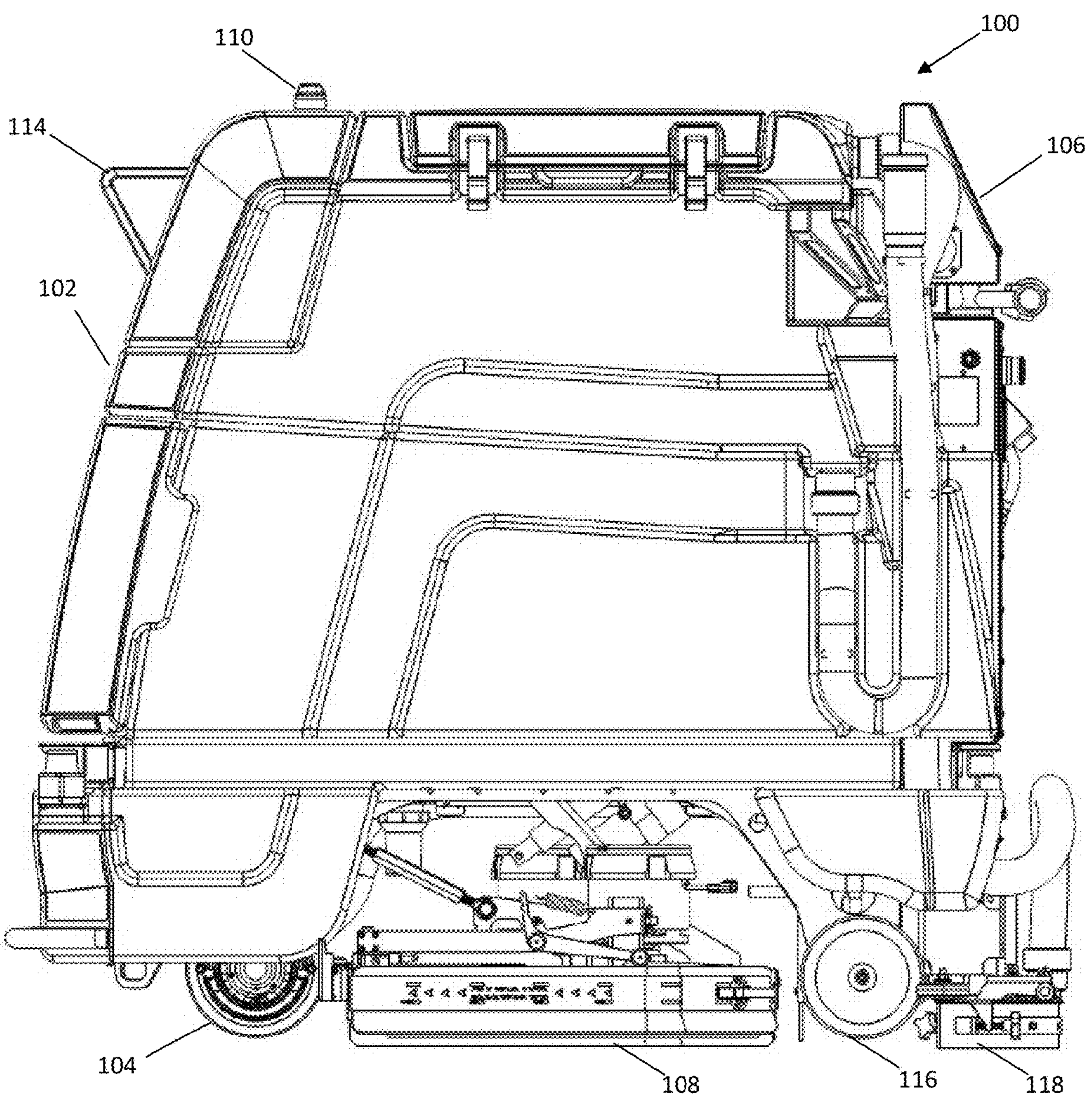
FIG. 4 is a left-side view of a semi-autonomous cleaning device.
Figure 5:
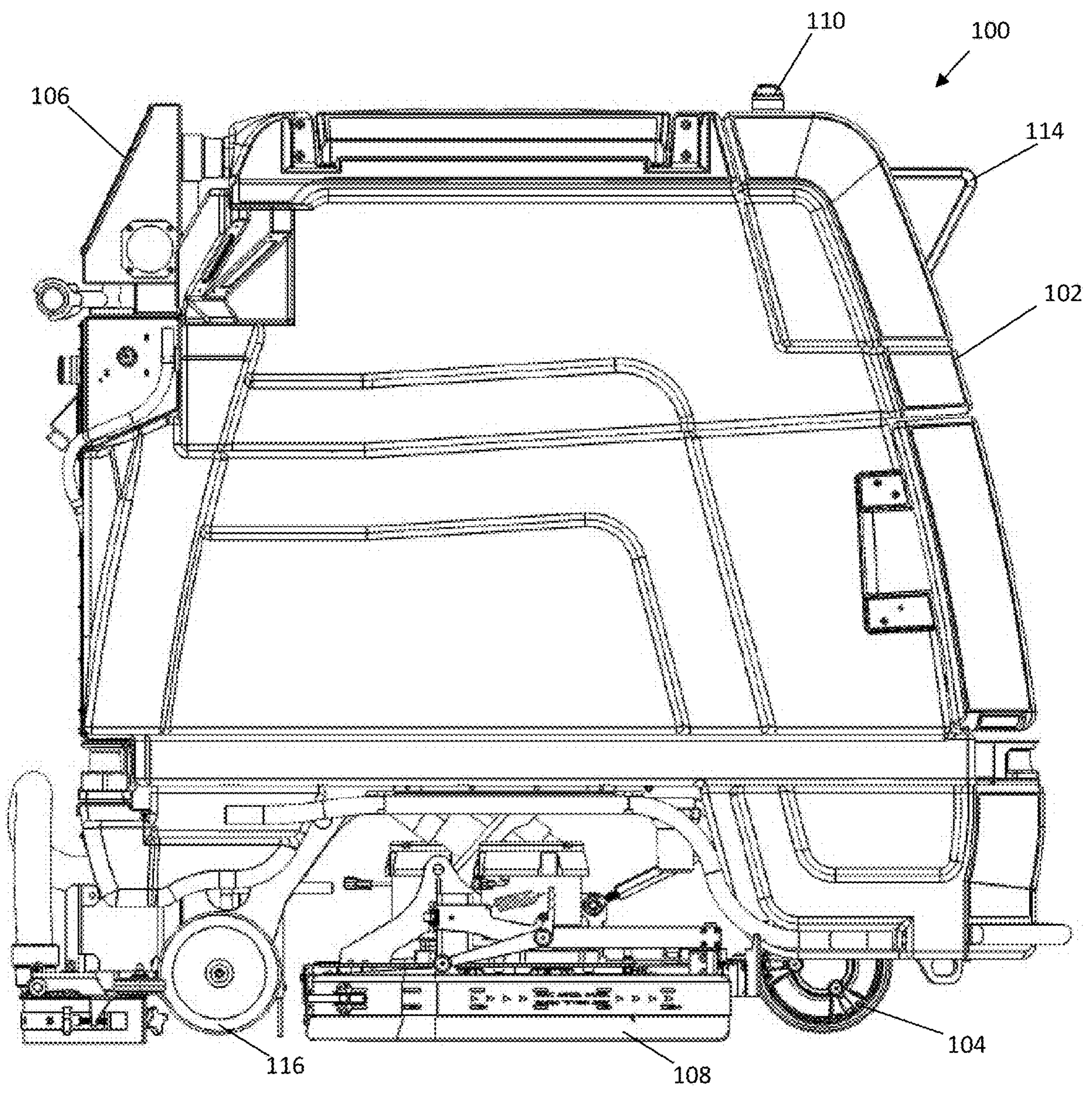
FIG. 5 is a right-side view of a semi-autonomous cleaning device.

An exemplary embodiment of an autonomous or semi-autonomous cleaning device is shown in FIGS. 1-5. FIG. 1 is a perspective view of a semi-autonomous cleaning device. FIG. 2 is a front view of a semi-autonomous cleaning device. FIG. 3 is a back view of a semi-autonomous cleaning device. FIG. 4 is a left side view of a semi-autonomous cleaning device, and FIG. 5 is a right-side view of a semi-autonomous cleaning device.

FIGS. 1 to 5 illustrate a semi-autonomous cleaning device 100. The device 100 (also referred to herein as "cleaning robot" or "robot") includes at least a frame 102, a drive system 104, an electronics system 106, and a cleaning assembly 108. The cleaning robot 100 can be used to clean (e.g., vacuum, scrub, disinfect, etc.) any suitable surface area such as, for example, a floor of a home, commercial building, warehouse, etc. The robot 100 can be any suitable shape, size, or configuration and can include one or more systems, mechanisms, assemblies, or subassemblies that can perform any suitable function associated with, for example, traveling along a surface, mapping a surface, cleaning a surface, and/or the like.

The frame 102 of cleaning device 100 can be any suitable shape, size, and/or configuration. For example, in some embodiments, the frame 102 can include a set of components or the like, which are coupled to form a support structure configured to support the drive system 104, the cleaning assembly 108, and the electronic system 106. Cleaning assembly 108 may be connected directly to frame 102 or an alternate suitable support structure or sub-frame (not shown). The frame 102 of cleaning device 100 further comprises strobe light 110, front lights 112, a front sensing module 114 and a rear sensing module 128, rear wheels 116, rear skirt 118, handle 120 and cleaning hose 122. The frame 102 also includes one or more internal storage tanks or storing volumes for storing water, disinfecting solutions (i.e., bleach, soap, cleaning liquid, etc.), debris (dirt), and dirty water. More information on the cleaning device 100 is further disclosed in U.S. utility patent application Ser. No. 17/650,678, entitled "APPARATUS AND METHODS FOR SEMI-AUTONOMOUS CLEANING OF SURFACES" filed on Feb. 11, 2022, the disclosure which is incorporated herein by reference in its entirety.

More particularly, in this embodiment, the front sensing module 114 further includes structured light sensors in a vertical and horizontal mounting position, an active stereo sensor and a RGB camera. The rear sensing module 128, as seen in FIG. 3, consists of a rear optical camera. In further embodiments, front and rear sensing modules 114 and 128 may also include other sensors including one or more optical cameras, thermal cameras, LiDAR (Light Detection and Ranging), structured light sensors, active stereo sensors (for 3D) and RGB cameras.

The back view of a semi-autonomous cleaning device 100, as seen in FIG. 3, further shows frame 102, cleaning hose 122, clean water tank 130, clean water fill port 132, rear skirt 118, strobe light 110 and electronic system 106. Electronic system 106 further comprises display 134 which can be either a static display or touchscreen display. Rear skirt 118 consists of a squeegee head or rubber blade that engages the floor surface along which the cleaning device 100 travels and channels debris towards the cleaning assembly 108.

FIG. 3 further includes emergency stop button 124 which consists of a big red button, a device power switch button 126 and a rear sensing module 128. Rear sensing module 128 further comprises an optical camera that is positioned to sense the rear of device 100. This complements with the front sensing module 114 which provides view and direction of the front of device 100, which work together to sense obstacles and obstructions.

Figure 6A:
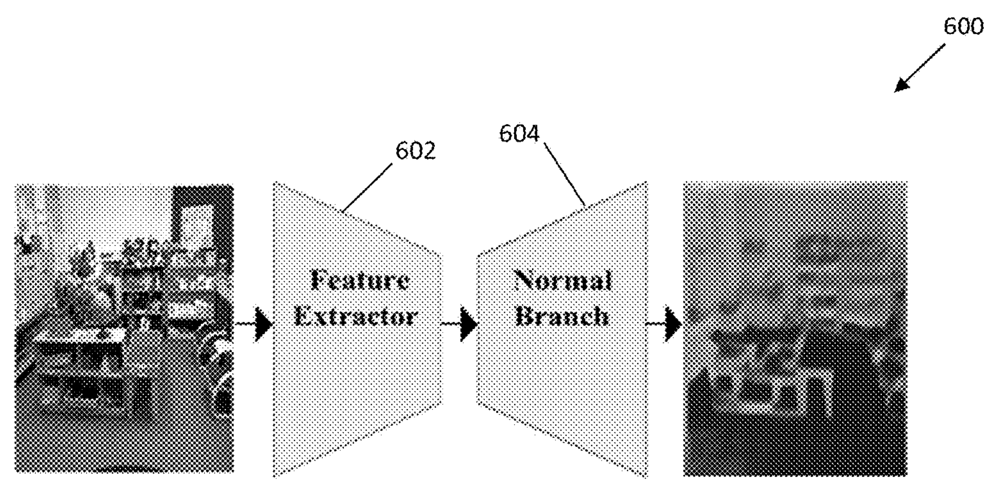
FIGS. 6A and 6B are diagrams illustrating the proposed approaches for normal estimation (FIG. 6A) and disparity estimation (FIG. 6B).
Figure 6B:
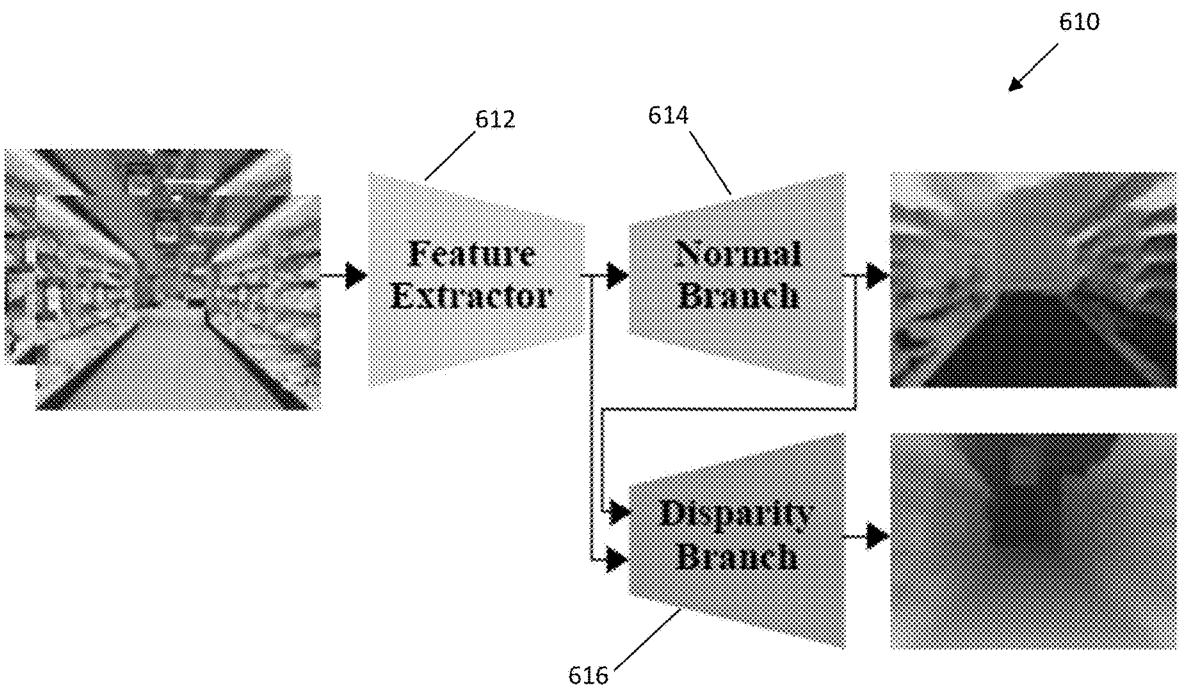

FIGS. 6A and 6B are diagrams illustrating the proposed approaches for normal estimation (FIG. 6A) and disparity estimation (FIG. 6B). The proposed neural network architecture as shown in FIGS. 6A and 6B consists of three modules: the feature extractor, normal-estimation branch, and disparity-estimation branch. These modules of the proposed scheme can be trained and evaluated in two different modes.

In the normal-estimation mode as shown in diagram 600 of FIG. 6A, the feature extractor 602 and normal-estimation branch 604 are used together to produce a surface normal map from an input image.

In the disparity-estimation mode as shown in diagram 610 of FIG. 6B, the feature extractor 612 receives stereo images and computes two sets of image features. When training the neural network in the disparity-estimation mode 610, the normal-estimation branch 614 is used to estimate two surface normal maps by using each set of image features. The disparity-estimation branch 616 then estimates both the left and right disparity maps given the image features and surface normal maps. However, in the evaluation stage, only the left image features are processed by the normal-estimation branch to obtain the left normal map. Using the left and right image features and the left surface normal, the disparity-estimation branch then estimates the left disparity map.

A surface normal map essentially describes the orientation of different surfaces in the environment. It has been shown previously that surface normal can provide certain supervision to supervised stereo-based depth estimation at ambiguous regions. With the high-dimensional features from a pair of stereo images, the disparity branch applies convolutions to predict the disparity maps with the predicted surface normal as additional inputs. The assistance from surface normal leads to better disparity accuracy at textureless regions.

This neural network is designed to train in two stages. In the first stage, both the feature extraction and normal branch are trained in a supervised manner. The L2 norm between the predicted surface normal and the ground truth surface normal is used as a training loss. The training loss helps update the parameters in these two modules via back propagation. In the second stage, only the disparity branch is trained in an unsupervised manner. The training loss for this stage consists of four components: a photometric loss, a smoothness loss, a normal consistency loss, and a left-right consistency loss. The photometric loss compares the difference between an original stereo image and a reconstructed stereo image based on the other stereo view and the associated predicted disparity.

If the predicted disparity is perfect, the original and the reconstructed views should be identical. The smoothness loss computes the smoothness of the predicted disparity map to reduce noisy disparity predictions. To obtain the normal consistency loss, the predicted disparity map is first converted to a surface normal map. This converted normal is compared against the predicted normal from the normal branch, which incorporates the supervisory signals from the normal. Lastly, the left-right consistency loss enforces the consistency between the left disparity map based on the left stereo image and the right disparity map based on the right stereo image in order to address the occlusion problem in stereo matching. Occlusion refers to a situation when certain pixels are only visible in one stereo view but not in the other.

1. Proposed Model Design

Figure 7:
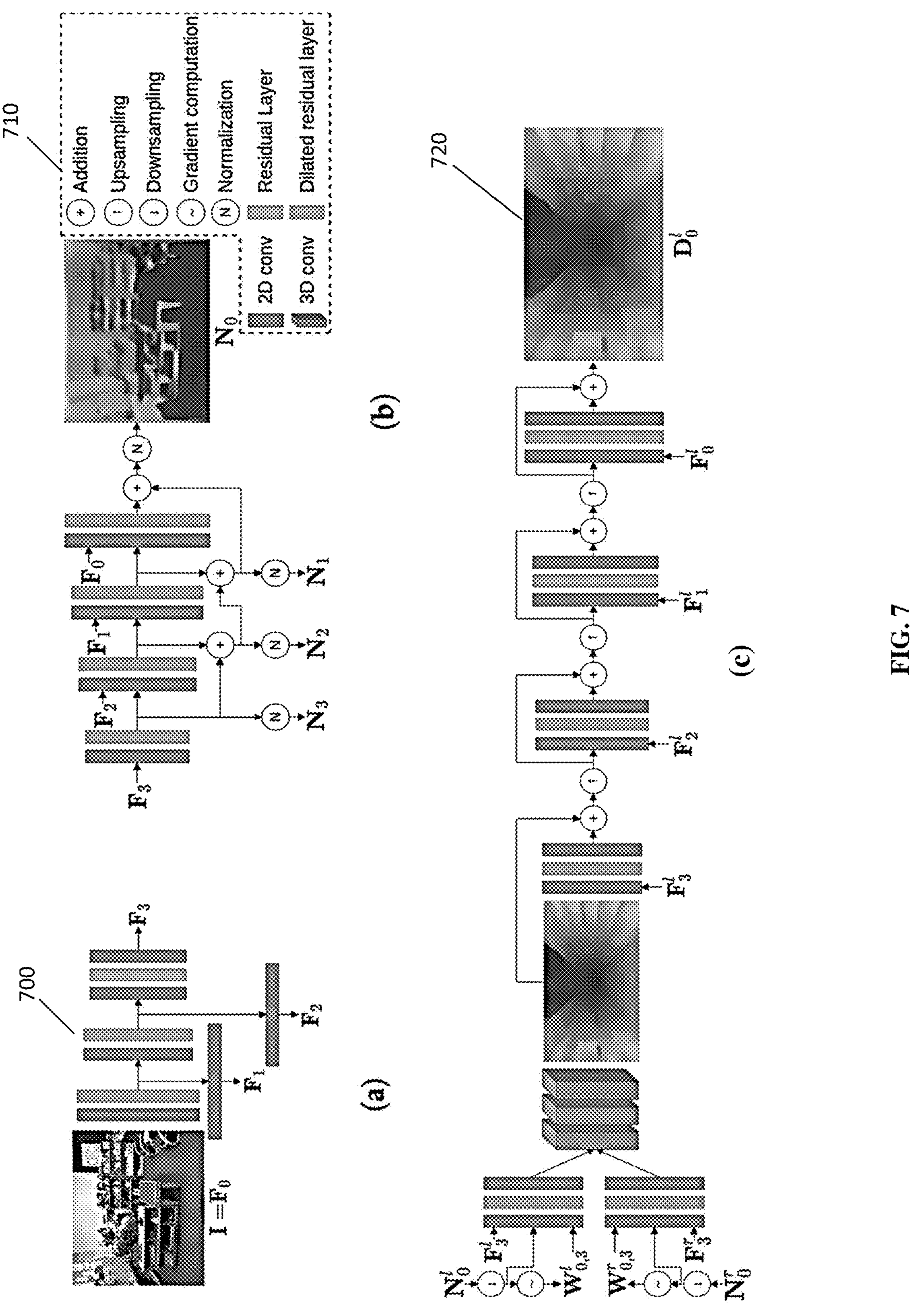
FIG. 7 is a diagram illustrating schematics of different modules in proposed network including a) feature extraction, b) normal branch and c) disparity branch.

FIG. 7 is a diagram illustrating schematic of different modules in proposed network including a) feature extraction as shown in diagram 700, b) normal branch as shown in diagram 710 and c) disparity branch as shown in diagram 720.

1.1 Feature Extraction Module

According to FIG. 7(*a*), the feature extraction module is further disclosed. The main purposes of the feature extraction module, as shown in diagram 700, are input image downsampling and high-level image feature extraction. The design of this module is inspired by ResNet-50 with three stages to compute a set of image features $\{F_0, F_1, F_2, F_3\}$ as shown FIG. 7(*a*). Assume an image $I \in R^{H \times W \times 3}$, where H is the image height and W is the image width, is available. Each stage first downsamples feature $$F_i \in \mathbb{R}^{\frac{H}{2^i} \times \frac{W}{2^i} \times C_i},$$

where $i \in \{0, 1, 2\}$ and $C_i$ is the number of channels, with a 5×5 convolutional layer followed by batch normalization and leaky ReLU activation to obtain a feature with size $$\frac{H}{2^{i+1}} \times \frac{W}{2^{i+1}} \times C_{i+1}.$$

This feature is then processed by a series of residual layers to obtain an intermediate feature $$F'_{i+1} \in \mathbb{R}^{\frac{H}{2^{i+1}} \times \frac{W}{2^{i+1}} \times C_{i+1}}.$$

The output feature $$F_{i+1} \in \mathbb{R}^{\frac{H}{2^{i+1}} \times \frac{W}{2^{i+1}} \times C_{i+1}}.$$

from this stage is computed by applying a 3×3 convolution to $F'_{i+1}$. To start feature extraction at the first stage, $$F'_0 = F_0 = I$$

is chosen explicitly. $C_i$ is set as 3, 32, 64, and 128 for i=0, 1, 2, 3, respectively.

In the normal estimation mode, we apply this module to only one input image to obtain $$\{F_0, F_1, F_2, F_3\}.$$

In the disparity estimation mode, two sets of image features $$\{F_0^l, F_1^l, F_2^l, F_3^l\} \text{ and } \{F_0^r, F_1^r, F_2^r, F_3^r\}$$

are extracted according to left and right stereo images, repectively.

1.2 Normal Branch Module

After obtaining the high-level image features, we use our proposed normal branch shown in FIG. 7(*b*) to predict surface normal as shown in diagram 710. Similar to the feature extraction module, the normal branch also follows a modular design to gradually up-sample the previous prediction. Additionally, instead of predicting a surface normal map at higher image resolution in each stage, our normal branch is inspired by a previous stereo matching network to predict surface normal residual at higher resolution.

At stage i of the normal branch, the image feature $F_i$ and an unnormalized surface normal $$N'_{i+1} \in \mathbb{R}^{\frac{H}{2^{i+1}} \times \frac{W}{2^{i+1}} \times 3}$$

from the previous stage i+1 of this branch are treated as the inputs.

$$N'_{i+1}$$

is first upsampled to match the spatial resolution of $F_i$ and then concatenated with $F_i$ to form a feature volume. The feature volume is then processed by a series of six 3×3 residual blocks with the leaky ReLU activation function, while maintaining the same spatial resolution and number of channels. The residual blocks are designed with dilation factors 1, 2, 4, 8, 1, 1, respectively.

After these dilated residual blocks, a 3×3 convolution is applied to the feature volume to compute the surface normal residual $$\Delta N_i \in \mathbb{R}^{\frac{H}{2^i} \times \frac{W}{2^i} \times 3}.$$

$\Delta N_i$ is then added to the up-sampled $$N'_{i+1}$$

to compute the unnormalized surface normal at the current scale $$N'_i \in \mathbb{R}^{\frac{H}{2^i} \times \frac{W}{2^i} \times 3}.$$

$N'_i$ is used in the next stage of normal prediction. Additionally, $N'_i$ is normalized to $$N_i \in \mathbb{R}^{\frac{H}{2^i} \times \frac{W}{2^i} \times 3}$$

as the output of stage i in the normal branch. After normalization, the Euclidean distance of all surface normal components at each pixel location of $N_i$ is 1.

There are four stages in the normal branch in total. To start the normal prediction process, the up-sampling and concatenation steps in stage 3 are neglected, while the input for this Stage is selected as $F_3$ which is processed by the dilated residual blocks directly. After four stages of computation, the outputs of the normal branch include $\{N_0, N_1, N_2, N_3\}$. $N_0$ at the input image's original resolution is considered as the final output of the normal branch for evaluation.

1.3. Disparity Branch Module

The design of the disparity branch as shown in diagram 720 in FIG. 7(*c*) follows the general architecture adopted by existing stereo matching models. This architecture often includes matching cost construction, cost aggregation, and disparity refinement. To exploit the benefit of the predicted surface normal from the normal branch, we propose an additional normal integration component to combine surface normal information with the matching cost. To introduce our design, we only consider the left stereo view and all estimations derived from this view as examples, unless otherwise stated. The same components can be applied to the right view easily.

1.3.1 Normal Integration

In addition to the image features computed by the feature extraction module, predicted surface normal maps from the normal branch may also be treated as image features, which can be exploited to facilitate better stereo matching. Therefore, we design a normal integration step to better incorporate this information.

From the normal branch, we can obtain the surface normal maps $$N_0^l \in \mathbb{R}^{H \times W \times 3} \text{ and } N_0^r \in \mathbb{R}^{H \times W \times 3}$$

for the left and right stereo images, respectively. Using the left view, we first downsample $$N_0^l \text{ to } N_{0\to 3}^l \in \mathbb{R}^{H/8 \times W/8 \times 3}$$

so that its spatial resolution matches that of $$F_{3'}^l.$$

Note that performing computation at such a low spatial resolution can help reduce the computational load in the downstream processes. From our experiments, we also observe that the predicted surface normal maps are generally more accurate at regions with smooth predictions. To minimize the effects of inaccurate surface normal, we further consider surface normal smoothness to create a weighting mask as $$w^l = \exp\left(-\lambda_w \sum_{j=1}^{3} \left|\nabla^2 N_{0\to 3}^l(\cdot, \cdot, j)\right|\right) \in \mathbb{R}^{H \times W},$$

where $\lambda_w=5$ is a constant and $\nabla^2$ denotes a 3×3 Laplacian filter. Then, we concatenate $$F_3^l, N_{0,3}^l, \text{ and } W^l$$

along the channel dimension. The concatenated cost volume is then processed by a 3×3 convolution followed by batch normalization and leaky ReLU activation to change its number of channels to 256. Then we apply a series of dilated residual blocks, which follow the same design as introduced in the Normal Branch Module section above, to balance the values in the combined feature. Lastly, another 3×3 convolution computes the output volume $$F_3'^l \in \mathbb{R}^{H/8 \times W/8 \times 256}$$

from this module.

1.3.2 Matching Cost Construction

After obtaining the left and right combined features $$F_3'^l \text{ and } F_3'^r,$$

the function utilizes them to construct a stereo matching cost volume by considering one of them as the reference feature, while the other feature is the target feature. The difference between the reference feature and the target feature shifted according to all disparity candidates is computed as the cost volume. If we assume the number of disparity candidates at the original image resolution is D, there are d=D/8 at the lowest image resolution. When using $$F_3'^l$$

as the reference feature, we obtain a left matching cost $$C^l \in \mathbb{R}^{H/8 \times W/8 \times 256 \times d}.$$

Similarly, a right matching cost $$C^r \in \mathbb{R}^{H/8 \times W/8 \times 256 \times d}$$

can be computed with $$F_3'^r$$

as the reference.

1.3.3 Cost Aggregation

To enable more robust stereo matching results, we perform cost aggregation on the matching costs. Cost aggregation in a data-driven stereo matching model is typically achieved by applying 3D convolutions to the cost volume along the spatial and disparity dimensions. Because of the high computational expense from 3D convolutions, a lightweight cost aggregation module with only five 3D convolutional layers is used. The first four 3D convolutions are followed by batch normalization and leaky ReLU activation.

They also maintain the number of channels for the cost volume at 256. The last convolution reduces the channel number to 1 to obtain an aggregated cost, from which a left initial disparity $$D_{init}^{l} \in \mathbb{R}^{H/8 \times W/8}$$

is regressed through the differentiable soft argmin.

1.3.4 Disparity Refinement

The low-resolution initial disparity computed from the aggregated cost may not include detailed estimates. To remedy this problem, we design a disparity refinement to gradually upsample the initial disparity map while introducing more details. Similar to the normal branch, the refinement module adopts a modular design with multiple stages.

The inputs of stage i are the refined disparity from the previous stage $$D_{i\text{-}1}^{l} \in \mathbb{R}^{H/2^{i-1} \times W/2^{i-1}}$$

and the left high-level feature $$F_i^l,$$

while its output is the refined disparity map at a higher resolution $$D_i^l \in \mathbb{R}^{H/2^i \times W/2^i}.$$

In this refinement stage, $$D_{i-1}^{l}$$

is first bilinearly upsampled to match the spatial resolution of $$F_i^l.$$

The upsampled disparity and $$F_i^l.$$

are then concatenated together along their channel dimension. The concatenated volume is then processed by a 3×3 convolution to reduce its channel number to 32. A series of dilated residual blocks, as discussed in the Normal Branch Module section above, is also applied to this volume. Following the residual blocks, the volume undergoes another 3×3 convolution, resulting in a disparity residual. The disparity residual is then added to the upsampled disparity. After addition, this refined disparity map passes through a ReLU activation function to obtain $$D_i^l$$

whose values are all non-negative.

Similar to the normal branch, the refinement module also includes four stages. At the first stage of refinement, which is stage 3, the upsampling step is neglected and the upsampled disparity is replaced by $$D_{init}^{l}$$

from the previous module. The refined disparity $$D_0^l$$

at the original resolution of the left stereo view is treated as the final output of the disparity branch.

2 Training Strategy 2.1 Training for Normal Estimation

In the normal mode, the network is trained in a supervised manner so that it is capable of predicting normal. With the set of predicted surface normal maps $\{N_3, N_2, N_1, N_0\}$ from an input image, the supervised training loss is $$\mathcal{L}_n = \sum_{i=0}^{3}\left(\frac{1}{2^i HW}\sum_p \|N_{i\to 0}(p) - N^*(p)\|_2\right),$$

where $N_{i\to 0}$ is the predicted surface normal $N_i$ that has been bilinearly upsampled to the input image's original resolution, N* denotes the ground truth surface normal map, and p denotes an arbitrary pixel. The weighting term $1/2^i$ enforces the training loss to focus more on predictions obtained at higher image resolutions. Note that only the feature extraction and normal branch are utilized to predict surface normal. Hence, only the parameters in these two modules are updated.

2.2 Training for Disparity Estimation

After the model obtains preliminary knowledge on surface normal prediction, we further train it for disparity estimation in the second stage of training. The training at this stage is fully unsupervised without using any ground truth information. During training, the parameters of the feature extraction module and surface normal branch are frozen. Therefore, back propagation is only allowed in the disparity branch. This training stage involves multiple training losses. The definitions for all training losses are given below by using the left view as the example. By applying similar formula, these losses can be expanded to the right view as well.

2.2.1 Photometric Loss

Photometric loss is the most important supervisory signal in unsupervised training of a stereo matching model. The photometric loss of a left-view pixel is defined as $$\mathcal{L}_{pho,i}^{l}(p) = \frac{\alpha}{2}\left(1 - SSIM\left(I^l(p), \hat{I}_i^l(p)\right)\right) + (1-\alpha)\left\|I^l(p) - \hat{I}_i^l(p)\right\|,$$

where α=0.85 and SSIM (•) denotes the structural similarity index measure $$\hat{I}_i^l$$

is a bilinearly reconstructed image according to $I^r$ and a bilinearly upsampled disparity map $$D_{i\to 0}^l \in \mathbb{R}^{H\times W} \text{ from } D_i^l.$$

2.2.2 Disparity Smoothness Loss

To prevent the model from estimating noisy disparity maps, a disparity smoothness loss is widely used to regularize the estimates. This smoothness loss is given as $$\mathcal{L}_{ds,i}^l(p) = \left|\nabla_x D_{i\to 0}^l(p)\right| e^{-\|\nabla_x I^l(p)\|} + \left|\nabla_y D_{i\to 0}^l(p)\right| e^{-\|\nabla_y I^l(p)\|},$$

where $\nabla_x$ and $\nabla_y$ are the gradients of an image with respect to the horizontal and vertical direction, respectively.

2.2.3 Normal Consistency Loss

In addition to the photometric and disparity smoothness losses, we also exploit the information provided by the predicted surface normal. This predicted surface normal can provide better supervisory information at ambiguous areas that cannot be easily resolved by the first two losses. The normal consistency loss is defined as $$\mathcal{L}_{n,i}^l(p) = W_{i\to 0}^l(p)\left\|N_{i\to 0}^l(p) - N_{D,i\to 0}^l(p)\right\|_2, \text{ where}$$

$$N_{D,i\to 0}^l \in \mathbb{R}^{H\times W\times 3}$$

denotes the surface normal converted from the upsampled disparity map $$D_{i\to 0}^l,$$

and the weight $$W_{i\to 0}^l \in \mathbb{R}^{H\times W}$$

is obtained by applying a formula to the upsampled left estimated surface normal map $$N_{i\to 0}^l.$$

The weight can constrain the normal consistency loss at smoother regions, which usually contain more accurate normal predictions.

2.2.4 Left Right Consistency Loss

To address occlusion, which is a common problem in stereo matching, a left right consistency loss is used. This loss is given as $$\mathcal{L}_{lr,i}^l(p) = \left|D_{i\to 0}^l(p) - \hat{D}_{i\to 0}^l(p)\right|, \text{ where } \hat{D}_{i\to 0}^l \in \mathbb{R}^{H\times W}$$

is a reconstructed left disparity map by bilinearly sampling the upsampled right disparity map $$D_{i\to 0}^r$$

according to the upsampled left disparity map $$D_{i\to 0}^l.$$

Moreover, since our model can predict multi-scale disparity and normal maps, we utilize estimates at all scales to train the disparity branch. The combined training loss based on left and right estimates at scale i is $$\mathcal{L}_{d,i} = \sum_p \alpha_{ph}\left(\mathcal{L}_{ph,i}^l(p) + \mathcal{L}_{ph,i}^r(p)\right) + \alpha_{ds}\left(\mathcal{L}_{ds,i}^l(p) + \mathcal{L}_{ds,i}^r(p)\right) + \alpha_n\left(\mathcal{L}_{n,i}^l(p) + \mathcal{L}_{n,i}^r(p)\right) + \alpha_{lr}\left(\mathcal{L}_{lr,i}^l(p) + \mathcal{L}_{lr,i}^r(p)\right),$$

where the superscript r denotes that the corresponding losses are based on the right-view images, and the α's are the weights for different terms. By collecting the training losses at all scales, the final loss for training at the second stage is $$\mathcal{L}_d = \frac{1}{4HW}\sum_{i=0}^{3}\left(\frac{1}{2^i}\mathcal{L}_{d,i}\right).$$

Figure 8:
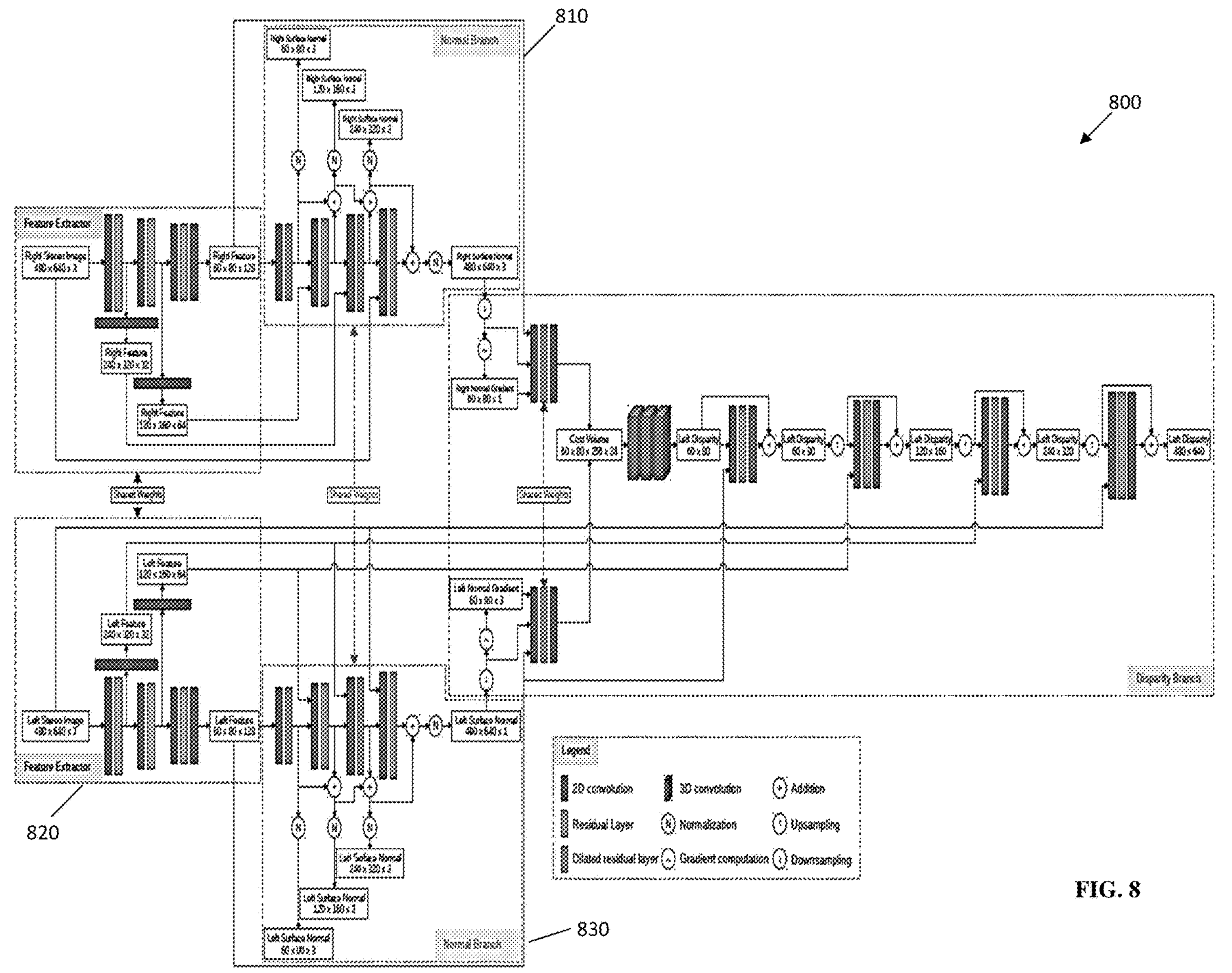
FIG. 8 is a diagram illustrating overview of an exemplary architecture.

FIG. 8 is a diagram illustrating overview of an exemplary architecture. According to FIG. 8, the entire framework 800 consists of three components: feature extractor 810, normal branch 820, and disparity branch 830.

The feature extractor uses a 480×640×3 (height×width×channel) RGB image as an input. A series of 2D convolutional layers and residual layers are applied to the image to obtain a number of high-level features at the resolutions of 240×320×32, 120×160×64, and 60×80×128, respectively. The same feature extractor is applied to both the left and right input stereo images.

In the normal branch, both the left and right image features at 60×80×128 are processed by a series of 2D convolutional layers and dilated residual layers to compute the left and right surface normal maps at different resolutions.

In the disparity branch, both the left and right surface normal maps at 480×640×3 are first downsampled to 60×80×3. The gradients of these two down-sampled normal maps are also computed. The left feature at 60×80×128, the down-sampled normal map at 60×80×3, and the left normal gradient at 60×80×1 are concatenated together to form a left feature. The same concatenation operation is applied to the right image feature, right surface normal, and right normal gradient as well. These two features are processed by the same 2D convolutions and dilated residual layers. The resulting features are used to construct a matching cost at 60×80×256×24, where 256 is the number of feature channels and 24 represents the number of candidate disparities at this scale.

The matching cost is first filtered by several 3D convolutional layers. Then, an initial disparity map at 60×80 is regressed from the matching cost. This initial disparity is gradually refined and up-sampled through a series of up-sampling layers, 2D convolutional layers, and dilated residual layers. The final output is the disparity map with a resolution of 480×640.

In the past, indoor stereo depth estimation has focused on supervised learning. Kusupati et al. proposed a neural network to extract features from the stereo images and perform surface normal prediction and depth prediction. This method is trained in a supervised manner such that the predicted depth and the predicted surface normal are compared against their corresponding ground truth. Wang et al. also designed a network that can predict both disparity and surface normal. However, their design follows a sequential manner such that a series of convolutions are used to predict a disparity map from a pair of stereo image inputs. Then the stereo images and the predicted disparity are sent into another network for surface normal prediction. Additionally, the difference between the disparity and surface normal and their ground truth is considered as the training loss.

In terms of unsupervised learning for stereo matching, a number of publications have been proposed and evaluated on the KITTI dataset collected in outdoor driving scenarios. Similar to our approach, these methods rely on the photometric loss and smoothness loss to provide supervision signals to train the network with the absence of ground truth data.

Compared to other embodiments, this disclosure can predict disparity images in an unsupervised manner without the need of ground truth disparity information for training. This can reduce the difficulty of adapting the network to new datasets.

The systems and methods of this disclosure are verified by both synthetic and real indoor datasets. More importantly, the performance of the model disclosed here, and existing ones, are compared for these indoor scenes. The results show that our algorithm outperforms. Therefore, it is more likely for our approach to perform well in real-life applications.

According to the disclosure, a system for unsupervised stereo matching of surfaces for a semi-autonomous cleaning apparatus is disclosed. The system comprises a processor, one or more cameras configured to capture stereo images and a neural network software module. The neural network software module further comprises a feature extraction module, a normal branch module and a disparity branch module.

According to the disclosure, the extraction module of the system and the normal branch module are trained in a supervised manner for surface normal prediction. The surface normal prediction of the system is then incorporated into the disparity branch module which is trained in an unsupervised manner for predicted disparity estimation. The predicted surface normal of the system is configured to estimate disparity at textureless regions. The predicted disparity estimation of the system is configured for accurate and improved stereo matching of indoor surfaces.

According to the disclosure, the system is configured for accurate disparity in indoor scenes without the need of learning from a large dataset with ground truth disparity. The system is configured as an unsupervised learning approach in order to reduce dependencies on a large amount of ground truth data that is difficult to collect.

According to the disclosure, a computer-implemented method for a semi-autonomous cleaning apparatus comprising a processor, one or more cameras configured to support a neural network software. The cleaning apparatus is configured for unsupervised stereo matching of surfaces and the method comprises the steps of receiving stereo images from the one or more cameras, sending the stereo images to the neural network software. The neural network software further comprises a feature extraction module, a normal branch module and a disparity branch module.

According to the disclosure, the method further comprises the steps of using the extraction module and the normal branch module to train stereo images in a supervised manner for surface normal prediction and sending the surface normal prediction into the disparity branch module and training the output data in an unsupervised manner for a predicted disparity estimation.

According to the disclosure, the predicted surface normal of the method is configured to estimate disparity at textureless regions. The predicted disparity estimation is configured for accurate and improved stereo matching of indoor surfaces.

According to the disclosure, the method is configured for accurate disparity in indoor scenes without the need of learning from a large dataset with ground truth disparity. The method is also configured as unsupervised learning approach in order to reduce dependencies on a large amount of ground truth data that is difficult to collect.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed:

1. A system for unsupervised stereo matching of surfaces for a semi-autonomous cleaning apparatus comprising: a processor; one or more cameras configured to capture stereo images; a neural network software module, the neural network software module further comprising: a feature extraction module; a normal branch module; and a disparity branch module; wherein the extraction module and the normal branch module are trained in a supervised manner for surface normal prediction; wherein the surface normal prediction is then incorporated into the disparity branch module which is trained in an unsupervised manner for predicted disparity estimation; wherein the predicted surface normal is configured to estimate disparity at textureless regions; wherein the predicted disparity estimation is configured for accurate and improved quality of stereo matching of indoor surfaces by estimating the surface normal accurately at the textureless regions, leading to improvement in the disparity-estimation accuracy and stereo-matching quality in indoor applications involving the textureless regions.

2. The system of claim 1 wherein the system is configured for accurate disparity in indoor scenes without the need of learning from a large dataset with ground truth disparity.

3. The system of claim 1 wherein the system is configured as an unsupervised learning approach in order to reduce dependencies on a large amount of ground truth data that is difficult to collect.

4. A computer-implemented method for a semi-autonomous cleaning apparatus comprising a processor, one or more cameras configured to support a neural network software, the cleaning apparatus configured for unsupervised stereo matching of surfaces, the method comprising the steps of: receiving stereo images from the one or more cameras; sending the stereo images to the neural network software, the neural network software further comprising: a feature extraction module; a normal branch module; and a disparity branch module; using the extraction module and the normal branch module to train stereo images in a supervised manner for surface normal prediction; and sending the surface normal prediction into the disparity branch module and training the output data in an unsupervised manner for a predicted disparity estimation; wherein the predicted surface normal is configured to estimate disparity at textureless regions; wherein the predicted disparity estimation is configured for accurate and improved quality of stereo matching of indoor surfaces by estimating the surface normal accurately at the textureless regions, leading to improvement in the disparity-estimation accuracy and stereo-matching quality in indoor applications involving the textureless regions.

5. The method of claim 4 wherein the method is configured for accurate disparity in indoor scenes without the need of learning from a large dataset with ground truth disparity.

6. The method of claim 1 wherein the method is configured as unsupervised learning approach in order to reduce dependencies on a large amount of ground truth data that is difficult to collect.

* * * * *